Figure 1:
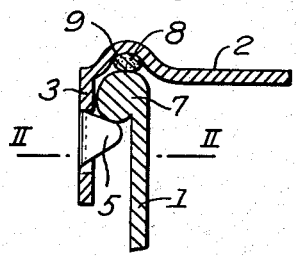

Sept. 2, 1941.   H. T. H. ANDRESEN   2,254,559
DEVICE FOR CLOSING OF CONTAINERS, COUPLING OF TUBES, ETC.
Filed June 6, 1938

Inventor:
Halvor T. H. Andresen
By
Watson, Cole, Grindle & Watson
Attorneys.

Patented Sept. 2, 1941

2,254,559

UNITED STATES PATENT OFFICE 2,254,559

DEVICE FOR CLOSING OF CONTAINERS, COUPLING OF TUBES, ETC.

Halvor Tobias Heyerdahl Andresen, Oslo, Norway

Application June 6, 1938, Serial No. 212,204
In Norway March 18, 1938

4 Claims. (Cl. 220—60)

This invention relates to connecting means, and is concerned more particularly with a novel connecting device by which a pair of objects may be readily and effectively connected together, the device permitting their easy separation and being capable of repeated use. The new connecting means is adapted for numerous purposes, but since it may be employed to especial advantage in securing closures upon vessels, such as bottles, jars, or the like made of materials including glass, earthenware, metal, cardboard, etc., adaptations of the invention to those uses will be illustrated and described in detail for purposes of explanation. It is to be understood, however, and will be at once appreciated that the utility of the invention is not limited to those specific examples.

In utilizing the invention in connection with a vessel or container to be closed by a cover or lid, one of the component parts, for example, the body of the vessel, is provided with a circumferential flange or bead against which the lid or cover is seated, either directly or with a packing interposed. The two parts are then secured together by means of a metal sleeve which is connected to the cover and is provided with a series of tongues which are struck therefrom to extend generally circumferentially and project inwardly so that they may engage the side of the flange opposite to that with which the cover is engaged. The sleeve may be formed integrally with the cover, if desired, or may be connected thereto in any other convenient way, as by having a portion overlying the cover. For most purposes, however, the cover is provided with an integral depending circumferential flange which is of sufficient length to extend down beyond the flange on the body of the vessel and is provided with the tongues, the sides of which pass beneath the body flange to hold the cover in place. The tongues are so formed that as the cover is moved into position, they pass beneath the body flange with a wedging or cam action, thus making it possible to secure the cover firmly in position or to remove it without severe manual effort. At the same time, when the cover is in place, the tongues hold it securely so that the vessel is tightly closed, and, when a packing is used, may be hermetically sealed.

When the annular portion which is provided with tongues, is made in an annular closure, a second series of tongues to be pressed against or engage over the edge of a lid or cover on the container may be provided, the two series of tongues being approximately parallel. This embodiment is particularly convenient for the coupling of two tube-like parts, each series of tongues being adapted to engage over a flange on each of the two parts to be coupled.

The accompanying drawing illustrates some embodiments of the invention.

Figure 2:
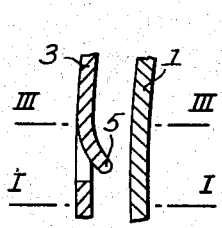
Figure 3:
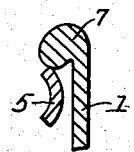
Figure 4:
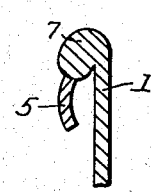
Figure 5:
Figure 6:
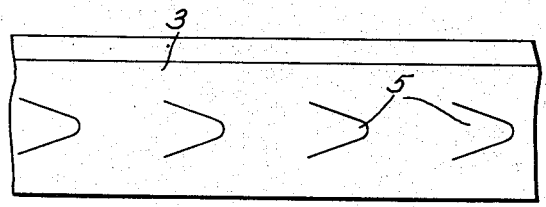
Figure 8:
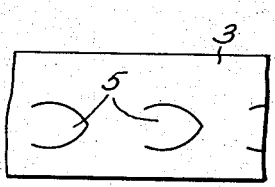
Figure 9:
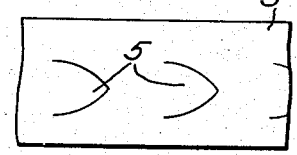
Figure 7:
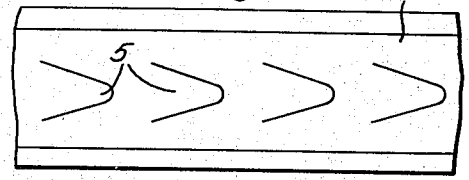
Figure 10:
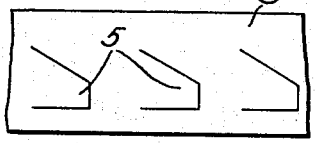
Figure 11:
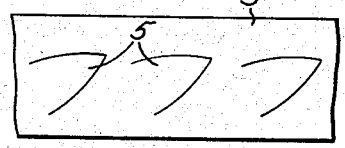
Figure 12:
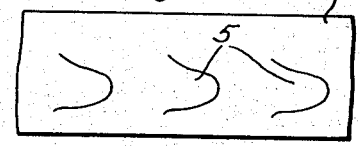
Figure 13:
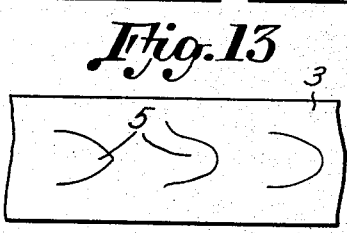
Figure 14:
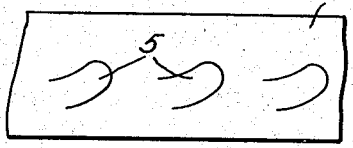
Figure 15:
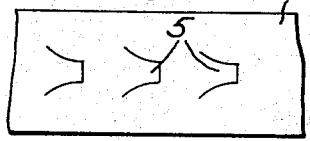

Figures 1, 2 and 3 show one embodiment of a cap formed closure, Fig. 1 being a fragmentary vertical section of the closure and container along the line I—I in Fig. 2, Fig. 2 being a horizontal section of the same along the line II—II in Fig. 1 and Fig. 3 being a vertical section of the same along the line III—III in Fig. 2. Figure 4 is a section similar to that shown in Fig. 3. Figure 5 shows a similar ring used for the coupling of two pipes with a packing inserted between the same. Figures 6 to 15 show various forms of tongues.

Referring now to the drawing, there is illustrated in Figures 1 to 4 the upper end of a container 1 having a closure 2 held in place by the connecting device of the invention. This closure is a metallic cap consisting of a disc and a peripheral sleeve 3 integral with the disc and extending axially thereof. The sleeve is provided with a plurality of tongues 5 extending generally circumferentially of the sleeve and having their roots or bases extending generally axially of the sleeve. The free ends of the tongues are bent inwardly. The vessel 1, with which the cap 2 is to be used, is formed with a flange 7 encircling its open end, and in the construction illustrated, the flange takes the form of an edge bead.

In mounting the cover on the vessel, the cover is moved toward the open end of the vessel, with the sleeve 3 enclosing the flange 7 until the tongues 5 pass beneath and engage the under surface of the flange. With the parts in this position, the tongues hold the cap securely in place, but the latter can be readily removed by first lifting one edge to disengage the adjacent tongues from beneath the flange, after which the other tongues may be disengaged progressively by raising the cap.

If a sealed closure is desired, a packing is interposed between the flange and cover, and for this purpose, the disc of the cover may be formed with a circumferential channel 9 in its under surface in which may be placed the packing ring 8. When the cover is in place on the vessel, the packing ring contacts with the top surface of the flange 7 and is held tightly between the cover and the flange.

It will be noted in Figures 6 to 15, that the tongues 5 are generally wedge-shaped, and as the cover is moved into closing position, the upper side edges of the tongues first make contact beneath the flange 7 near the points of the tongues and, as the closing operation is completed, the point of contact of the flange with each tongue moves upwardly along the inclined side edge of the tongue. The tongues thus act with a wedging or cam action which makes application of the cover an easy operation and insures that it will fit tightly.

The tongues may be of straight section, but preferably are of curved section, being given this shape as they are formed. If the tongues have a convex outer surface, as shown in Figure 4, their locking effect is increased, while if the tongues are formed with a concave outer surface (Figure 3), their engagement with the flange on the vessel is more yielding, and this permits the cover to be more easily put in position and removed.

In the construction shown in Figure 1, the sleeve 3 is formed as an integral part of the closure member, but it may be made separate therefrom, if desired, an example of such constructions being shown in Figure 5, wherein the connection between the sleeve and cover is made by a second series of tongues 5'. These tongues overlie the edge of the cover disc, while the tongues of the series 5 underlie the flange 7 on the vessel, a packing being, if desired, inserted between the flanges.

The shape to be given the tongues and the angle between their base lines and the longitudinal direction may vary considerably and different forms are shown in Figures 6 to 15 inclusive.

In general, the shape of the tongues is not critical, but varying locking effects may be obtained according to the shape or inclination of the edge of the tongue which engages beneath the flange. This edge of the tongue operates, as previously described, with a wedging or camming action, and the nature of the action accordingly depends on the shape of the edge.

In all forms of the invention, the tongues are so formed that their side edges engage the flange, and this makes possible the wedge action of the tongues and thus permits the connecting means to be applied without difficulty, and the connection as easily broken. If the tongues were so formed that the free ends thereof engaged beneath the flange, no wedging action could be obtained and, in addition, disconnection might be difficult, since the movement of the part carrying the tongues away from the part provided with the flange would probably result in the tongues being forced more firmly into position beneath the flange.

In the drawing, the container or vessel has been illustrated as of metal with an opening circular in form, but it will be apparent that the connecting means of the invention may be used with containers of various other materials, such as glass, earthenware, paper board, etc., and having openings of various other shapes.

I claim:

1. In means for securing together a pair of objects the combination of a circumferential outwardly projecting bead on one of the said objects, a sleeve embracing the said bead and being in connection with the second of the said objects, a series of spaced tongues integral with and circumferentially of the said sleeve and arranged parallel to the said bead on the first object, the said tongues being defined by cuts of approximately horse-shoe form with the open ends of said cuts facing generally circumferentially, each of said tongues being bent inwardly at an acute angle from the surface of the sleeve along lines extending generally axially of the sleeve and each tongue being also curved along lines extending generally perpendicularly to the lines of bending and circumferentially of the sleeve, so as to be adapted to engage the said bead on the first object.

2. A container comprising in combination, a container body, having an outwardly projecting bead extending parallel and adjacent to the open end of the said body, a cover having a depending flange embracing the portion of the body carrying the said bead, a series of spaced tongues integral with and circumferentially of the said flange and arranged parallel to the said bead on the said body, the said tongues being defined by cuts of approximately horse-shoe form with the open ends of said cuts facing generally circumferentially, each of said tongues being bent inwardly at an acute angle from the surface of the said flange along lines extending generally axially of the flange, and each tongue being also curved along the lines extending generally perpendicularly to the said lines of bending so as to provide for inwardly projecting tongues having inwardly convex faces adapted to engage under the bead on the container body.

3. Means for securing together two objects of tube like form comprising in combination, an outwardly projecting bead extending parallel and adjacent to the open end of each one of the said two tube like objects, a sleeve embracing the portions of the said tubes carrying the said beads, two series of spaced tongues integral with and circumferentially of the said sleeve and arranged parallel to one another and to the said two beads, the said tongues being defined by cuts of approximately horse-shoe form with the open ends of said cuts facing generally circumferentially, each of said tongues being bent inwardly at an acute angle from the surface of the sleeve along lines extending generally axially of the sleeve and each tongue being also curved along lines extending generally perpendicularly to the lines of bending and circumferentially of the sleeve, so as to adapt the tongues of the two said series to engage opposite sides of the said two beads.

4. A container comprising in combination, a container body, having an outwardly projecting bead extending parallel and adjacent to the open end of the said body, a cover having a depending flange embracing the portion of the body carrying the said bead, a series of spaced tongues integral with and circumferentially of the said flange and arranged parallel to the said bead on the said body, the said tongues being defined by cuts of approximately horse-shoe form with the open ends of said cuts facing generally circumferentially, each of said tongues being bent inwardly at an acute angle from the surface of the said flange along lines extending generally axially of the flange, and each tongue being also curved along the lines extending generally perpendicularly to the said lines of bending so as to provide for inwardly projecting tongues having inwardly concave faces adapted to engage under the bead on the container body.

HALVOR T. H. ANDRESEN.